United States Patent [19]
Higo et al.
[11] Patent Number: 4,820,910
[45] Date of Patent: Apr. 11, 1989

[54] SECURITY SYSTEM AND LOCK

[75] Inventors: Yakichi Higo, Tokyo; Hiroshi Morimoto, Himeji, both of Japan

[73] Assignees: Daicel Chemical Industries, Ltd., Osaka; Yakichi Higo, Tokyo, both of Japan

[21] Appl. No.: 896,666

[22] Filed: Aug. 14, 1986

[30] Foreign Application Priority Data

Aug. 30, 1985 [JP] Japan ............................ 60-189868

[51] Int. Cl.[4] ............................................ G06K 7/00

[52] U.S. Cl. ................................ 235/439; 235/435; 235/441

[58] Field of Search ............... 235/485, 441, 449, 488, 235/466, 492, 480, 435, 466, 476, 439; 340/825.31

[56] References Cited

U.S. PATENT DOCUMENTS

| | | | |
|---|---|---|---|
| 3,900,716 | 8/1975 | Kawabata et al. | 235/460 |
| 3,935,431 | 1/1976 | Scheffel | 235/441 |
| 4,058,705 | 11/1977 | Cannon | 235/485 X |
| 4,079,360 | 3/1978 | Ookvbo et al. | 235/449 X |
| 4,104,515 | 8/1978 | Thornburg et al. | 235/488 |
| 4,582,985 | 4/1986 | Lofbers | 235/380 |

*Primary Examiner*—M. H. Pascall
*Assistant Examiner*—A. Jonathan Wysocki
*Attorney, Agent, or Firm*—Bucknam and Archer

[57] ABSTRACT

A code system comprising a temperature-resistance conversion element the change of electric resistance value of which describes a hysteresis loop with respect to a temperature change; a means for changing the temperature of said temperature-resistance conversion element; a means for detecting the change of the electric resistance of said conversion element; and a time counting means of counting the actuation time of said temperature changing means. A hard lock device for use in the code system is also disclosed.

16 Claims, 6 Drawing Sheets

SECURITY SYSTEM AND LOCK

BACKGROUND OF THE INVENTION

1. Field of the Invention

This invention relates to a code system using, for example, a thermo-elastic martensite alloy as a temperature-resistance conversion element and to a hard lock device for use in the code system.

The code system and the hard lock device in accordance with the present invention may be applied to an arbitrary application where secrecy is a requisite. For instance, the present invention may be applied to an access circuit to a computer program which must be kept secret, a lock circuit of a door for a secret entrance, an access circuit to a magnetic disc or optical disc, identification cards whose applications are equivalent to those of IC cards and magnetic cards, and so forth.

2. Prior Art Description

Most of the conventional code circuits or lock systems use softwares and are disadvantageous in that the softwares can be decoded by a trial-and-error method. Lock systems relying upon hardwares are mostly of a mechanical or electromagnetic type, and it is difficult to make such systems in small sizes. In addition, there is an inherent limit to the number of combinations of the codes.

Furthermore, since the conventional code circuits consists mainly of solid semiconductive elements such as ICs and LSIs, the code data and the like are likely to be destroyed by external static electricity or magnetism.

SUMMARY OF THE INVENTION

It is therefore an object of the present invention to provide a code system which renders impossible the speedy decoding thereof by a trial-and-error method quickly, that is, which requires an extended period of time for decoding and hence cannot be decoded practically, and provide a hard lock device for use in the code system.

It is another object of the present invention to provide a code system which consists fundamentally of resistors alone and is not substantially susceptible to external static electricity and magnetism, and a hard lock device for use in the code circuit.

The code system in accordance with the present invention includes one or more temperature-resistance conversion elements the change of the electric resistance value of which describes a hysteresis loop with respect to a temperature change, a means for changing the temperature of the temperature-resistance conversion element, a means for detecting the change of the electric resistance of the conversion element due to the temperature change, and a time counting means for counting the time for actuation of the means for causing the temperature change.

The temperature-resistance conversion elements used in the present invention include thermo-elastic martensite transformation alloys which are generally known as shape-memory alloys. Various thermo-elastic martensite transformation metals or alloys (hereinafter referred to as "M transformation alloys") per se are known as so-called shape-memory alloys such as Cu—Zn, Cu—Zn—X (where X is Al, Sn, Ca or Si), Cu—Au—Zn, Ag—Cd, Au—Cd, Au—Ag—Cd, Cu—Al—Ni, Cu—Sn, Ti—Ni, Ni—Al, In—X (where X is Tl, Cd, Pb or Sn), Fe—Pd, Mn—Cu, Mn—Ni, Fe—Pt and Fe—Ni—Ti—Co.

These M transformation alloys have their peculiar temperature-resistance hysteresis characteristics, among which suitable alloys are selected depending on the purpose of use and on the intended application.

In the present invention, the M transformation alloy is assembled as the resistance element into an electric circuit, and the change of its resistance value when a temperature change is applied thereto, is used for reading a signal. Besides self-exothermic action such as Joule heat, arbitrary known means exemplified by an external heater such as an electric heater or a hot air heater and by thermal rays such as laser light may be used as the means for imparting the temperature change to the M transformation alloy.

The M transformation alloy may be produced, for example, by melting and homogenizing metals in an inert gas atmosphere, or subjecting them to high frequency ion plating, vacuum deposition, sputtering, and the like to form films thereof.

The M transformation metal may be formed in the code circuit according to the present invention by various known methods for producing electronic elements. Such known methods include a method comprising cutting a piece from a strip of the M transformation alloy and fixing an electrical terminal to the piece as in the case of the production of diodes, a method comprising physically vapor depositing the M transformation alloy in a pattern form through a mask on a silicon chip which forms a diode as in the case of the production of an IC memory, and a method comprising laminating or vapor depositing the M transformation alloy on the whole surface of a substrate to form a film thereof and then etching the film in a desired pattern as in the case of producing a printed substrate.

The present invention is characterized in that the M transformation alloy, for example, is used as the temperature-resistance conversion element. When used, this M transformation alloy will generally exhibit its behavior as indicated by the temperature-resistance curve shown in FIG. 1 in the accompanying drawings and the curve forms a hysteresis loop exhibiting resistance values which are different at the time of heating (exothermy) than at the time of cooling (being left cooled). The temperature (T) and resistance ($R_M$) values of this hysteresis loop vary depending on the kind of the M transformation alloys used, and a suitable alloy is selected from the known alloys depending on the intended application.

The means for detecting the change of the electric resistance with respect to the temperature change may be of a non-contact type or a contact type using terminals.

The means of the non-contact type for detecting the change of the electric resistance includes one which detects an eddy current (Foucault current), and the means of the contact type includes one in which terminals are connected to the conversion elements and resistance detection circuits using a voltage drop method or a bridge method are employed.

The means for causing a temperature change of the temperature-resistance conversion elements is preferably an external heater, but it is possible to utilize as such a means the autogeneous heat which is Joule heat caused by applying power to the conversion element.

The external heater includes an electric induction heater, electric resistance furnace, heating media including a gas and/or liquid, and heat rays including laser beams.

This invention relates also to a hard lock device for use in the code system described above. The hard lock device comprises a support and temperature-resistance conversion elements which are supported on and/or inside the support and the change of the electric resistance value of which describes a hysteresis loop with respect to the temperature change.

Arbitrary materials such as ceramics, glass, metals, wood and plastics may be used either alone or in combination as a material for the support described above. The support may be formed into various shapes such as a card, disc, sheet, block, film, line and belt, and may also be incorporated in other devices which need to be locked, such as memory media e.g., IC cards, LSI chips, optical discs, and electronic locks.

The above and other objects and novel features of the present invention will become more apparent from the following description when taken in conjunction with the accompanying drawings.

DESCRIPTION OF THE PREFERRED EMBODIMENTS

Preferred embodiments of the present invention will hereinafter be described with reference to the accompanying drawings.

Figure 1:
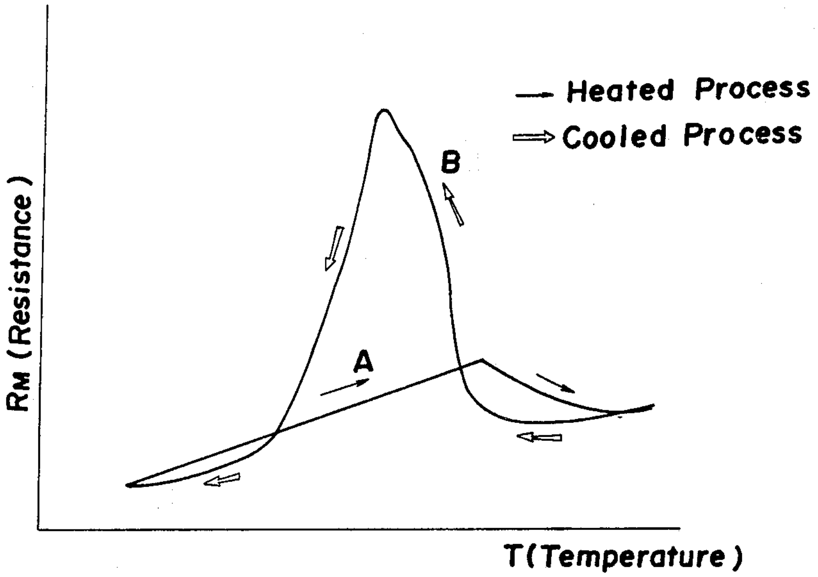
FIG. 1 is a diagram showing the characteristics of a martensite transformation alloy used in a code system in accordance with the present invention.
Figure 2:
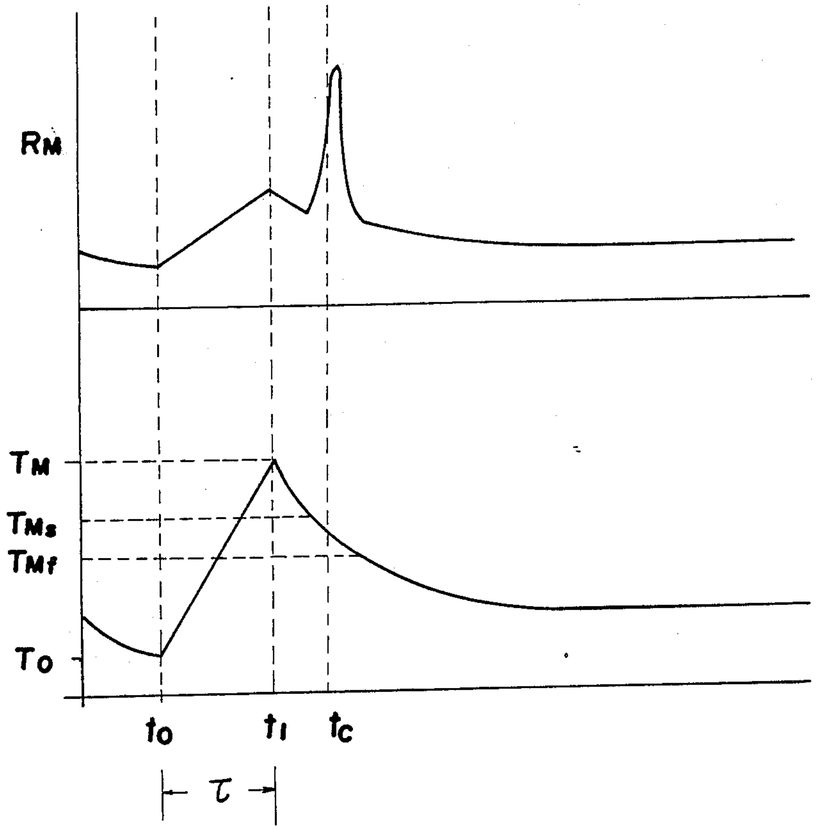
FIG. 2 is a waveform diagram showing the characteristics of the martensite transformation alloy.

First of all, the principle of the fundamental operation of the M transformation alloy used in the embodiments of the present invention will be described with reference to FIGS. 1 and 2. Assuming that the conversion element is heated from a time $t_o$ to $t_1$ to raise its temperature from $T_o$ to $T_M$, the resistance $R_M$ of the element will gradually rise as shown in FIG. 2. When the heating is stopped at the time $t_1$, the temperature of the element will then gradually drop as shown in FIG. 2. When a time $t_c$, for example, is reached during this cooling step, the resistance $R_M$ of the element starts to rise rapidly, then exhibits its peak value and thereafter drops rapidly. In the present invention, the code system is accomplished by utilizing the M transformation alloy element characterized in that it exhibits the peak value under predetermined conditions.

Figure 3:
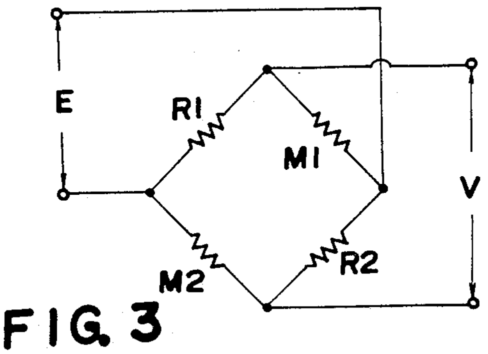
FIG. 3 is an electric circuit diagram of the code system in accordance with one embodiment of the present invention.

FIG. 3 shows an embodiment of the present invention which realizes the code system in the form of a wheatstone bridge. In this embodiment, M transformation alloys M1 and M2 and ordinary resistors R1 and R2 are wired to one another as shown in FIG. 3. The following relation exists between them:

$$R1 \cdot R2 = M1 \cdot M2$$

Figure 4:
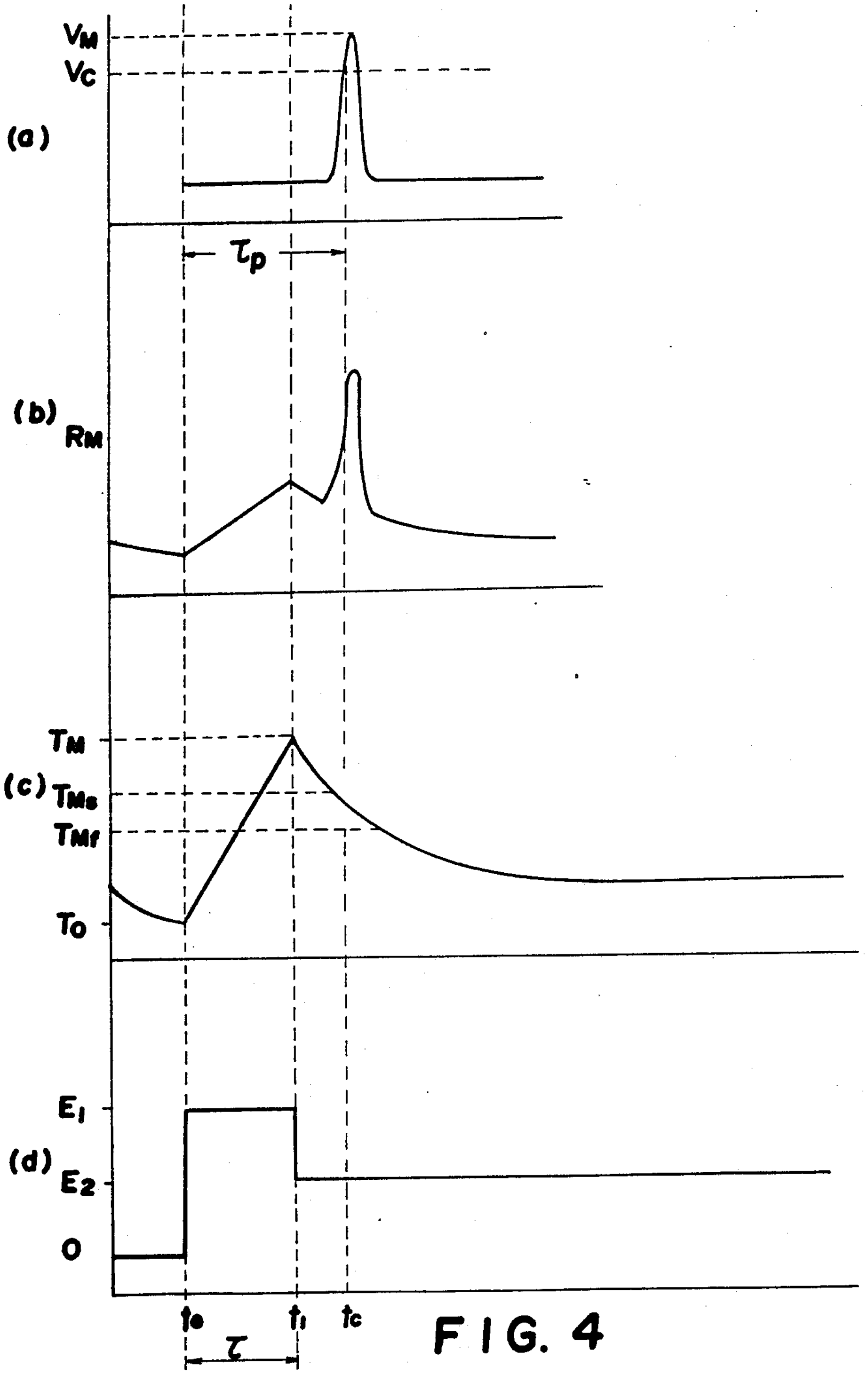
FIG. 4 is a waveform diagram showing the operation of the circuit shown in FIG. 3.

FIG. 4 shows operation waveforms of the circuit shown in FIG. 3. First of all, when an input voltage E is raised to E1 as shown in FIG. 4(*d*), the temperature of the M transformation alloys M1, M2 starts rising from $T_o$ due to the Joule heat as shown in FIG. 4(*c*). It is clear that this step may be effected by use of an external heating means such as a heater. After the passage of a predetermined time $\tau$, the input voltage is lowered to E2, whereupon the temperature starts dropping from $T_M$ (The external heating source is cut off at this time if used as such). In the step described above, the resistance value $R_M$ of M1, M2 first rises gently as shown in FIG. 4(*b*). This step corresponds to A of FIG. 1. When the exothermic (heating) step is complete after the passage of time $\tau$, the temperature of M1, M2 starts lowering, but during this heat lowering step (which may be a forced cooling step by use of a cooler), the resistance value $R_M$ drastically increases (B in FIG. 1) and reaches the peak value. After reaching this peak value, the resistance drops again. In each step described above, the output voltage of the circuit shown in FIG. 3 changes in a manner similar to that of the resistance value $R_M$ as shown in FIG. 4(*a*). The time $\tau p$ till the occurrence of the peak voltage $V_M$ is a function of the characteristics of M1, M2 and their temperature change conditions.

Therefore, in the circuit such as shown in FIG. 3, the time $\tau p$ varies depending on the input voltage values E1, E2 determining the temperature change conditions of the M transformation alloys M1, M2 and on the duration time $\tau$ of the input voltage E1. In this instance, a hard lock system may be constituted by permitting only a particular user to set a value on at least one of these four variables E1, E2, $\tau$ and $\tau p$.

Figure 5:
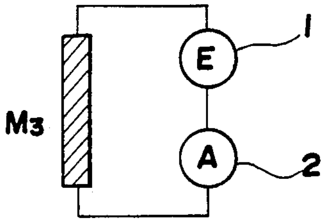
FIGS. 5 and 6 are block circuit diagrams showing the code systems in accordance with other embodiments of the present invention, respectively.

FIG. 5 shows the principle of the code system in accordance with another embodiment of the present invention. In this figure, an M transformation alloy M3, an input power source circuit 1 for supplying an input voltage to this M transformation alloy M3 and a current detection circuit 2 for detecting a current flowing through the M transformation alloy M3, are connected in a closed loop, for example.

In the circuit shown in FIG. 5, when the output voltage of the input power source circuit 1 changes in the same manner as an input voltage shown in FIG. 4(*d*), for example, the resistance value of the M transformation alloy M3 will also change in the same way as the resistance $R_M$ in FIG. 4. Therefore, when this resistance $R_M$ attains the peak value, the current value of the closed loop circuit will become minimal. The detection of this minimal current value by the current detection circuit 2 will render it possible to know the time $\tau p$ in FIG. 4. Accordingly, the circuit shown in FIG. 5 may also be used as the code system in the same way as the circuit shown in FIG. 3.

Figure 6:
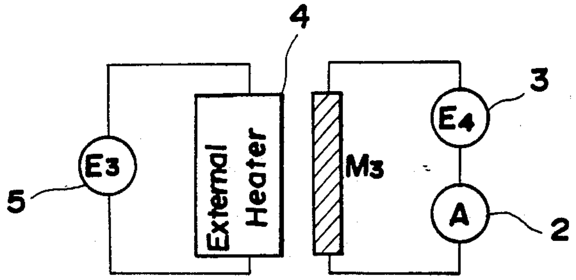

FIG. 6 shows still another embodiment of the code system of the present invention. The circuit shown in this figure is equipped with a closed loop circuit including an M transformation alloy M3, a power source 3 and a current detection circuit 2, an external heater 4 for heating or cooling the M transformation alloy M3 and an input power source circuit 5 for applying an input voltage E to the external heater 4.

In the circuit shown in FIG. 6, power for the heating is applied in a predetermined interval by the input power source circuit 5 to the external heater 4, and the temperature of the M transformation alloy M3 is controlled as shown in FIG. 4(*c*), for example. Since the resistance value of the M transformation alloy M3 changes in the same way as the resistor $R_M$ in FIG. 4(*b*), the arrival of the resistance value of the M transformation alloy M3 at the peak value can be detected by supervising the current that flows through the M transformation alloy M3 by the current detection circuit 2. In addition, the power source 3 consists of, for example, a constant voltage circuit that outputs a predetermined voltage.

Figure 7:
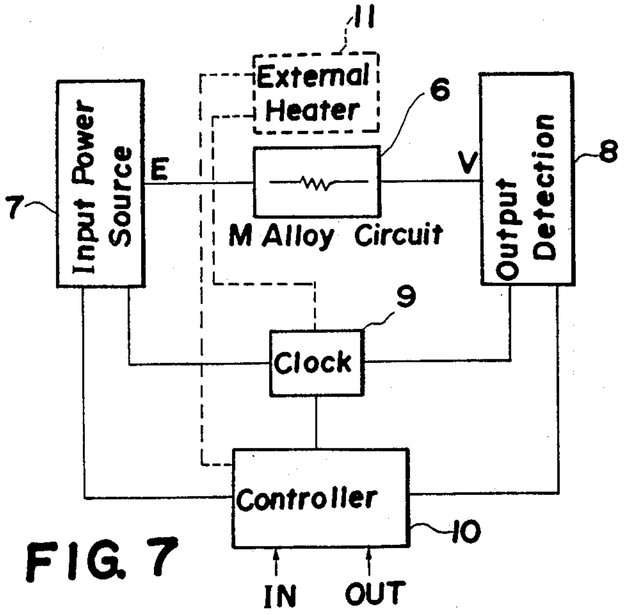
FIG. 7 is a block circuit diagram showing a hard lock system in accordance with still another embodiment of the present invention.

FIG. 7 is a schematic illustration of a hard lock system using the code system that contains the M transformation alloy element described above. In addition to the code system circuit 6 described above, the hard lock system shown in FIG. 7 includes an input power source circuit 7, an output detection circuit 8, a clock generation circuit 9 and a controller 10. As required, an external heater 11 may be disposed in order to heat the M transformation alloy of the code system circuit 6.

In the system shown in FIG. 7, the controller 10 supplies a control signal to the input power source circuit 7, and the input voltage E is applied to the code system circuit 6 in accordance with the content of this control signal. The code system circuit 6 generates the peak voltage $V_M$ after the passage of the predetermined time $\tau p$ in response to the voltage value of the input voltage E and the duration time as described above, and the output detection circuit 8 detects the peak voltage. The controller 10 detects the time $\tau p$ on the basis of the clock pulse supplied thereto from the clock generation circuit 9, outputs an output signal OUT as an enable signal when the time $\tau p$ is within a predetermined error range with respect to a target value which is decided by the input voltage E and by the characteristics of the code system circuit 6, but does not output this enable signal when the time $\tau p$ is not within the error range.

The input signal IN to the controller 10 may be a secret number or other data supplied from a keyboard or card-reader, not shown in the drawing, and the controller 10 supplies the control signal that determines the voltage value of the input voltage E and the duration time, to the input power source circuit 7.

When the circuit shown in FIG. 7 is used for a cash dispenser of a bank, for example, the input voltage E having the predetermined voltage value and duration time is supplied to the code system circuit 6 on the basis of the secret number inputted by a customer and other data stored in a magnetic card or the like. If the time $\tau p$ detected by the output detection circuit 8 in response to this input voltage E proves to be appropriate, the controller 10 outputs the enable signal and cash is dispensed by the cash dispenser.

Figure 8:
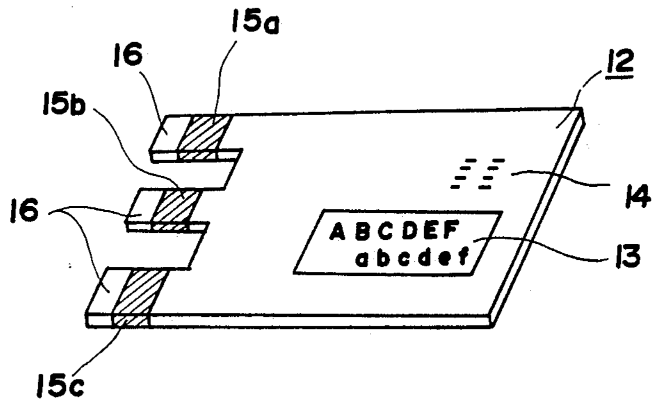
FIG. 8 is a perspective view of another embodiment of an ID card to which the code system of the present invention has been applied.

FIG. 8 shows still another embodiment of the invention wherein the M transformation alloy element is assembled in part of a card. The card body 12 in this case may be a mere support or a write-in board of readable character data 13. Furthermore, it may be an LSI board or IC card with a built-in IC circuit (with only a terminal 14 being shown in the drawing). Such a board or card may be used for making access to computer control of a production line or installation for which secrecy must be kept.

In this embodiment, small pieces 15*a*, 15*b*, 15*c* of the M transformation alloy are buried in three projections 16 which are buried or fitted and held at one of the ends of the card. Needless to say, one such projection will also do for the above purpose.

The material for the card body 12 may be selected from any known materials such as plastics, ceramics, metals, wood, paper or their combinations depending on the kind of the M transformation alloy and the temperature range in which it is used. The heat transfer rate and the temperature rise rate will change with the materials or their combination selected, and hence the selection and combination of these materials is one of the parameters of the code system of the present invention.

The materials so selected must have sufficient self-supporting properties within the temperature range in which the M transformation alloy operates. More particularly, the selected materials may be those that can be used within the temperature range (which is generally from minus several ten degrees to plus several hundred degrees C.) in which the M transformation alloy describes a hysteresis loop. Since the M transformation alloy describes the same hysteresis loop if it has the same temperature hysteresis, it is not always necessary to set the operation temperature at room temperature or so. In short, a suitable operation temperature range may be selected in consideration of the economy of usable cooling and heating media used and the operation accuracy of the M transformation alloy used.

Figure 9:
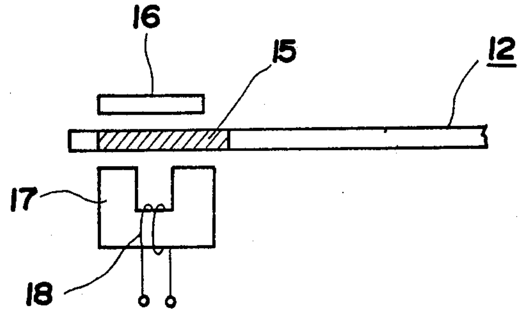
FIG. 9 is a diagrammatic view showing a method of heating the ID card shown in FIG. 8.

FIG. 9 is a schematic view of a system which makes a non-contact measurement of the temperature-resistance change of the M transformation alloy small piece 15 supported by the card of FIG. 8. In FIG. 9, cores 16 and 17 are disposed in such a manner as to interpose the M transformation alloy small piece 15 between them, and an AC is supplied to a coil 18 which is wound on the core 17, so that an eddy current occurs in the M transformation alloy small piece 15 to effect induction heating.

Figure 10:
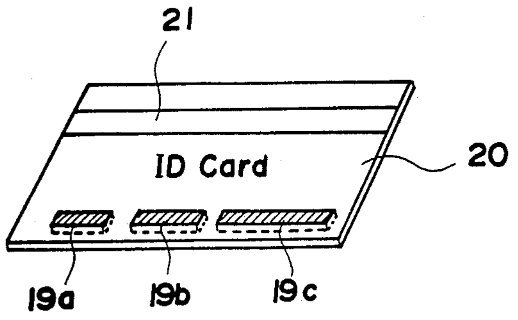
FIG. 10 is a perspective view of still another embodiment of an ID card to which the code system of the present invention has been applied.

FIG. 10 shows still another embodiment wherein the M transformation alloy elements 19*a*, 19*b*, 19*c* are disposed on an ID card 20 such as a bank cash card. In this embodiment, a magnetic stripe 21 is also disposed in the card in order to establish interchangeability with a conventional magnetic card.

Figure 11:
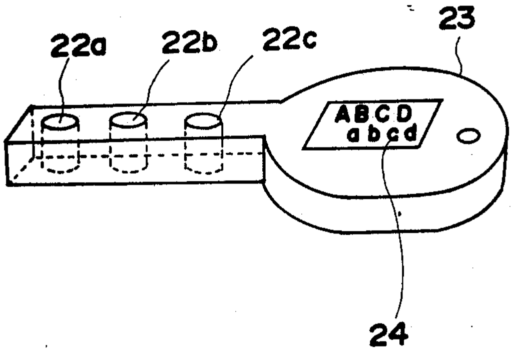
FIG. 11 is a perspective view of an embodiment of a key to which the code system of the invention has been applied.

FIG. 11 shows still another embodiment wherein the M transformation alloy elements 22*a*, 22*b*, 22*c* are disposed on a key 23. When the key 23 having such a construction is fitted to a lock device, not shown, the M transformation alloy elements 22*a*, 22*b*, 22*c* are heated for a predetermined period of time by a heater disposed in the lock device, and the time $\tau p$ from the start of heating till the outputting of the peak voltage, for example, is detected in the same manner as described above. This time $\tau p$ is measured for each of the M transformation alloy elements 22*a*, 22*b*, 22*c*, and when the time is within a predetermined range, the lock is released.

As is seen from the foregoing, the present invention uses, as the code system, a material, such as the M transformation alloy, the change of electric resistance value of which describes a hysteresis loop with respect to the temperature change. Accordingly, the heating or cooling operation of the M transformation alloy is necessary for decoding, and unlike the conventional code relying upon softwares, the code of the present invention cannot be decoded at all by a trial-and-error method within a limited period of time. In other words, a long time is necessary to break the code of the present invention whereby is provided a code circuit which can practically not be decoded and can keep extremely reliably the secret information or data confidential. Since the code circuit of the present invention consists fundamentally of the resistor alone, it will not raise the problems that the coded data are destroyed by external static electricity or magnetism or an enable signal and the like are accidentally outputted. Thus, the present invention provides extremely highly reliable code circuits and hard lock systems.

Although the present invention has thus been described in its preferred form, it is understood that the invention is not particularly limited thereto but various changes and modifications can be made without departing from the spirit and scope thereof.

What is claimed is:

1. A security system, comprising:

(a) a temperature-resistance conversion element having a hysteresis loop characteristic which exhibits a peak electrical resistance at a peak time after the temperature of the element has been raised and then lowered;

(b) temperature changing means operative from a start time for raising and then lowering the temperature of the element to generate the peak electrical resistance;

(c) means for detecting the generation of the peak electrical resistance;

(d) timing means responsive to the detecting means, for measuring a time interval between the start time and the peak time; and (e) control means responsive to the timing means, for generating a security signal when the time interval lies within a predetermined range.

2. The security system as recited in claim 1, wherein the conversion element is a thermo-elastic martensite transformation alloy.

3. The security system as recited in claim 1, wherein the temperature changing means heats the element and, in turn, increases the resistance from a heat value of resistance to a second value of resistance, said second value of resistance being lower than said peak resistance; and wherein the temperature changing means stops heating the element at a stop time after which the resistance initially decreases in value, then at the peak time increases to the peak electrical resistance, and thereafter decreases in value.

4. The security system as recited in claim 1, wherein said hysteresis loop characteristic is a closed loop having more than one value of resistance for a given temperature.

5. The security system as recited in claim 1, wherein said temperature changing means includes means for applying a voltage having a first amplitude during the raising of the temperature of the element, and for applying a voltage having a second amplitude during the lowering of the temperature of the element, said second amplitude being less than said first amplitude.

6. The security system as recited in claim 1, wherein said temperature changing means includes a heater in thermal communication with the element.

7. The security system as recited in claim 6, wherein said heater is an induction heater.

8. The security system as recited in claim 1, wherein said detecting means includes means for connecting the element to an electrical circuit connected to a voltage supply, and means for detecting a peak voltage corresponding to the peak resistance.

9. The security system as recited in claim 1, wherein said detecting means includes means for connecting the element to an electrical circuit connected to a voltage supply, and means for detecting a minimum of electrical current corresponding to the peak resistance.

10. The security system as recited in claim 1, wherein said detecting means is located out of physical contact with the element.

11. The security system as recited in claim 10, wherein said temperature changing means is operative to generate eddy currents in the elements, and wherein the detecting means is operative to detect a change in the eddy currents upon the generation of the peak resistance.

12. The security system as recited in claim 1, wherein said timing means includes a clock connected to the temperature changing means, the detecting means and the control means.

13. The security system as recited in claim 1, wherein said control means has an actuatable input to which a code signal is supplied, and an output from which the security signal is supplied.

14. The security system as recited in claim 1, and further comprising a support on which the conversion element is supported, said support maintaining its shape during operation of the temperature changing means.

15. The security system as recited in claim 1, wherein said support is a planar sheet.

16. A lock for use in a security system, comprising:

(a) a temperature-resistance conversion element having a hysteresis loop characteristic which exhibits a peak electrical resistance at a peak time after the temperature of the element has been raised and then lowered; and (b) a support on which the conversion element is supported, said support maintaining its shape during the change in temperature of the element.

* * * * *